United States Patent
Sczomak et al.

(10) Patent No.: US 10,077,727 B2
(45) Date of Patent: Sep. 18, 2018

(54) ENGINE CONTROL SYSTEMS AND METHODS FOR NITROGEN OXIDE REDUCTION

(71) Applicant: GM Global Technology Operations LLC, Detroit, MI (US)

(72) Inventors: David P. Sczomak, Troy, MI (US); Robert J. Gallon, Northville, MI (US); Robert S. McAlpine, Lake Orion, MI (US); Arun S. Solomon, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 260 days.

(21) Appl. No.: 14/994,531

(22) Filed: Jan. 13, 2016

(65) Prior Publication Data

US 2017/0198652 A1 Jul. 13, 2017

(51) Int. Cl.
*F01N 3/00* (2006.01)
*F02D 41/02* (2006.01)
(Continued)

(52) U.S. Cl.
CPC ....... *F02D 41/0275* (2013.01); *F01N 3/0814* (2013.01); *F01N 3/0842* (2013.01);
(Continued)

(58) Field of Classification Search
CPC ............. F01N 2430/02; F01N 2610/02; F01N 2900/08; F01N 2900/1614;
(Continued)

(56) References Cited

U.S. PATENT DOCUMENTS 4,305,351 A 12/1981 Staerzl
5,021,227 A 6/1991 Kobayashi et al.
(Continued)

FOREIGN PATENT DOCUMENTS

DE 10155404 A1 5/2003
DE 69922366 T2 12/2005
(Continued)

OTHER PUBLICATIONS

Szekely, G, Combustion Characteristics of a Spray-Guided DI Stratified Charge Engine with a High Squish Piston, SAE Tech Paper, 2005-01-1937, SAEWarrendale PA USA.
(Continued)

*Primary Examiner* — Jesse Bogue

(57) ABSTRACT

A fuel control module controls fuel injection of an engine based on a predetermined lean air/fuel ratio. The predetermined lean air/fuel ratio is fuel lean relative to a stoichiometric air/fuel ratio for the fuel. A cylinder control module selectively deactivates opening of intake and exhaust valves of M cylinders of the engine to increase removal of nitrogen oxide (NOx) from exhaust. M is an integer greater than 0 and less than a total number of cylinders of the engine. The fuel control module further: disables fueling of the M cylinders while opening of the intake and exhaust valves of the M cylinders is deactivated; and, while fueling of the M cylinders is disabled and opening of the intake and exhaust valves of the M cylinders is deactivated, controls fuel injection of other cylinders based on a predetermined rich air/fuel ratio that is fuel rich relative to the stoichiometric air/fuel ratio.

4 Claims, 6 Drawing Sheets

(51) Int. Cl.
  *F01N 3/08* (2006.01)
  *F01N 3/20* (2006.01)
  *F02D 13/00* (2006.01)
  *F02D 41/30* (2006.01)
  *F02D 41/00* (2006.01)
  *F02D 13/06* (2006.01)

(52) U.S. Cl.
  CPC ........... *F01N 3/2066* (2013.01); *F02D 13/00* (2013.01); *F02D 13/06* (2013.01); *F02D 41/0087* (2013.01); *F02D 41/3005* (2013.01); *F01N 2430/02* (2013.01); *F01N 2610/02* (2013.01); *F01N 2900/08* (2013.01); *F01N 2900/1614* (2013.01); *F01N 2900/1622* (2013.01); *F01N 2900/1818* (2013.01); *F02D 2041/0012* (2013.01); *F02D 2200/0806* (2013.01); *Y02T 10/18* (2013.01); *Y02T 10/24* (2013.01)

(58) Field of Classification Search
  CPC ..... F01N 2900/1622; F01N 2900/1818; F01N 3/0814; F01N 3/0842; F01N 3/2066; F02D 13/00; F02D 13/06; F02D 2041/0012; F02D 2200/0806; F02D 41/0087; F02D 41/0275; F02D 41/3005; Y02T 10/18; Y02T 10/24
  See application file for complete search history.

(56) References Cited

U.S. PATENT DOCUMENTS

| | | | |
|---|---|---|---|
| 5,575,259 A | 11/1996 | Fukui et al. | |
| 5,778,667 A | 7/1998 | Kinugasa et al. | |
| 5,782,087 A | 7/1998 | Kinugasa et al. | |
| 6,047,542 A | 4/2000 | Kinugasa et al. | |
| 6,089,077 A | 7/2000 | Daniels | |
| 6,109,024 A | 8/2000 | Kinugasa et al. | |
| 6,227,164 B1 | 5/2001 | Miller | |
| 6,345,496 B1 | 2/2002 | Fuwa et al. | |
| 6,357,408 B1 | 3/2002 | Bridge et al. | |
| 6,361,754 B1 | 3/2002 | Peter-Hoblyn et al. | |
| 6,401,703 B1 | 6/2002 | Mamiya et al. | |
| 6,520,142 B2 | 2/2003 | Nogi et al. | |
| 6,567,526 B1 | 5/2003 | Hoshino | |
| 6,609,493 B2 | 8/2003 | Yamaguchi et al. | |
| 6,659,074 B2 | 12/2003 | Lippert et al. | |
| 6,662,552 B1 | 12/2003 | Gunther et al. | |
| 6,775,623 B2 | 8/2004 | Ali et al. | |
| 6,854,438 B2 | 2/2005 | Hilger et al. | |
| 6,904,752 B2 * | 6/2005 | Foster | B60H 1/00314 60/285 |
| 7,063,642 B1 | 6/2006 | Hu et al. | |
| 7,152,573 B2 | 12/2006 | Abet et al. | |
| 7,204,081 B2 | 4/2007 | Yasui et al. | |
| 7,377,273 B2 | 5/2008 | Miyashita | |
| 7,472,545 B2 | 1/2009 | Hemingway et al. | |
| 7,610,900 B2 | 11/2009 | Lippert et al. | |
| 7,673,444 B2 | 3/2010 | Yano et al. | |
| 7,731,925 B2 | 6/2010 | Gloeckle | |
| 7,814,747 B2 | 10/2010 | Bandl-Konrad et al. | |
| 8,041,498 B2 | 10/2011 | Brown et al. | |
| 8,091,342 B2 | 1/2012 | Perry et al. | |
| 8,146,555 B2 | 4/2012 | Solomon et al. | |
| 8,291,695 B2 | 10/2012 | Perry et al. | |
| 8,381,512 B2 | 2/2013 | Brinkman et al. | |
| 8,393,140 B2 | 3/2013 | Perry et al. | |
| 8,424,289 B2 | 4/2013 | Narayanaswamy et al. | |
| 8,448,423 B2 | 5/2013 | Najt et al. | |
| 2002/0069640 A1 | 6/2002 | Irisawa et al. | |
| 2002/0129600 A1 | 9/2002 | Yamamoto et al. | |
| 2003/0085643 A1 | 5/2003 | Matsubara | |
| 2003/0089331 A1 | 5/2003 | Ueda et al. | |
| 2003/0168038 A1 | 9/2003 | McKay | |
| 2004/0011326 A1 | 1/2004 | Yamashita et al. | |
| 2004/0012318 A1 | 1/2004 | Ishikawa | |
| 2005/0129601 A1 | 6/2005 | Li et al. | |
| 2007/0051333 A1 | 3/2007 | Ashizawa | |
| 2007/0092426 A1 | 4/2007 | Driscoll et al. | |
| 2007/0137182 A1 | 6/2007 | Driscoll | |
| 2007/0157608 A1 | 7/2007 | Gandhi et al. | |
| 2008/0026932 A1 | 1/2008 | Satoh et al. | |
| 2008/0041040 A1 | 2/2008 | During | |
| 2008/0053071 A1 | 3/2008 | Adams et al. | |
| 2008/0089820 A1 | 4/2008 | Jacob | |
| 2008/0102010 A1 | 5/2008 | Bruck et al. | |
| 2010/0186391 A1 | 7/2010 | Najt et al. | |
| 2010/0212295 A1 * | 8/2010 | Narayanaswamy | F02D 41/0082 60/285 |
| 2011/0083639 A1 * | 4/2011 | Gallon | F02D 17/02 123/321 |
| 2011/0202253 A1 * | 8/2011 | Perry | B01D 53/9477 701/102 |
| 2012/0166070 A1 | 6/2012 | Katou et al. | |
| 2012/0204845 A1 | 8/2012 | Gingrich et al. | |
| 2012/0316754 A1 * | 12/2012 | Narayanaswamy | F02D 41/024 701/103 |
| 2013/0074817 A1 | 3/2013 | Fisher et al. | |
| 2015/0354424 A1 | 12/2015 | Kumar et al. | |
| 2015/0354484 A1 * | 12/2015 | Zur Loye | F02D 41/0082 123/481 |
| 2016/0025021 A1 | 1/2016 | Hilditch et al. | |
| 2017/0037757 A1 | 2/2017 | Tanaka | |
| 2017/0159525 A1 | 6/2017 | Backhaus | |

FOREIGN PATENT DOCUMENTS

| | | |
|---|---|---|
| DE | 102005022420 A1 | 6/2006 |
| JP | 2000277234 A | 10/2000 |
| JP | 2003257585 A | 9/2003 |
| JP | 2006318664 A | 11/2006 |

OTHER PUBLICATIONS

Hybrid Spark Plug OE Success for NGK with New Audi R8, NGK Press Release, Apr. 24, 2007, p. 1-2, NGK Spark Plugs (UK) Limited, Hemel Hempstead, UnitedKingdom.
Hybrid Spark Plug OE Success for NGK with New Audi R8, NGK Press Release, 2006, p. 1, NGK Spark Plug Europe GmbH, Ratingen, Germany.
Ogunwumi, S., In-Situ NH3 Generation for SCR NOx Applications, SAE 2002-01-2872, 2002, SAE International, San Diego, CA.
Nakahira, T., "Catalytic Engine" NOx Reduction of Diesel Engine with New Concept Onboard Ammonia Synthesis System, SAE 920469, 1992, SAE International, Detroit, MI.
U.S. Appl. No. 15/046,580, dated Feb. 18, 2016, Sczomak et al.
About.com, "Port Fuel Injection", archived Sep. 17, 2005.
Joseph R. Theis "Selective Catalytic Reduction for Treating the NOx Emissions from Lean-Burn Gasoline Engines: Performance Assessment" SAE Technical Paper Series, Detroit, MI, USA.
Joseph R. Theis "Selective Catalytic Reduction for Treating the NOx Emissions from Lean-Burn Gasoline Engines: Durability Assessment" SAE Technical Paper Series, Detroit, MI, USA.
Tadao Nakatsuji "A NOx Reduction system using ammonia-storage selective catalytic reduction in rich/lean excursions" Science Direct, Jul. 27, 2007.
Kim, C., Perry, K, Viola, M., Li, W. et al., "Three-Way Catalyst Design for Urealess Passive Ammonia SCR: Lean-Burn SIDI Aftertreatment System," SAE Technical Paper 2011-01-0306, 2011, doi:10.4271/2011-01-0306.

* cited by examiner

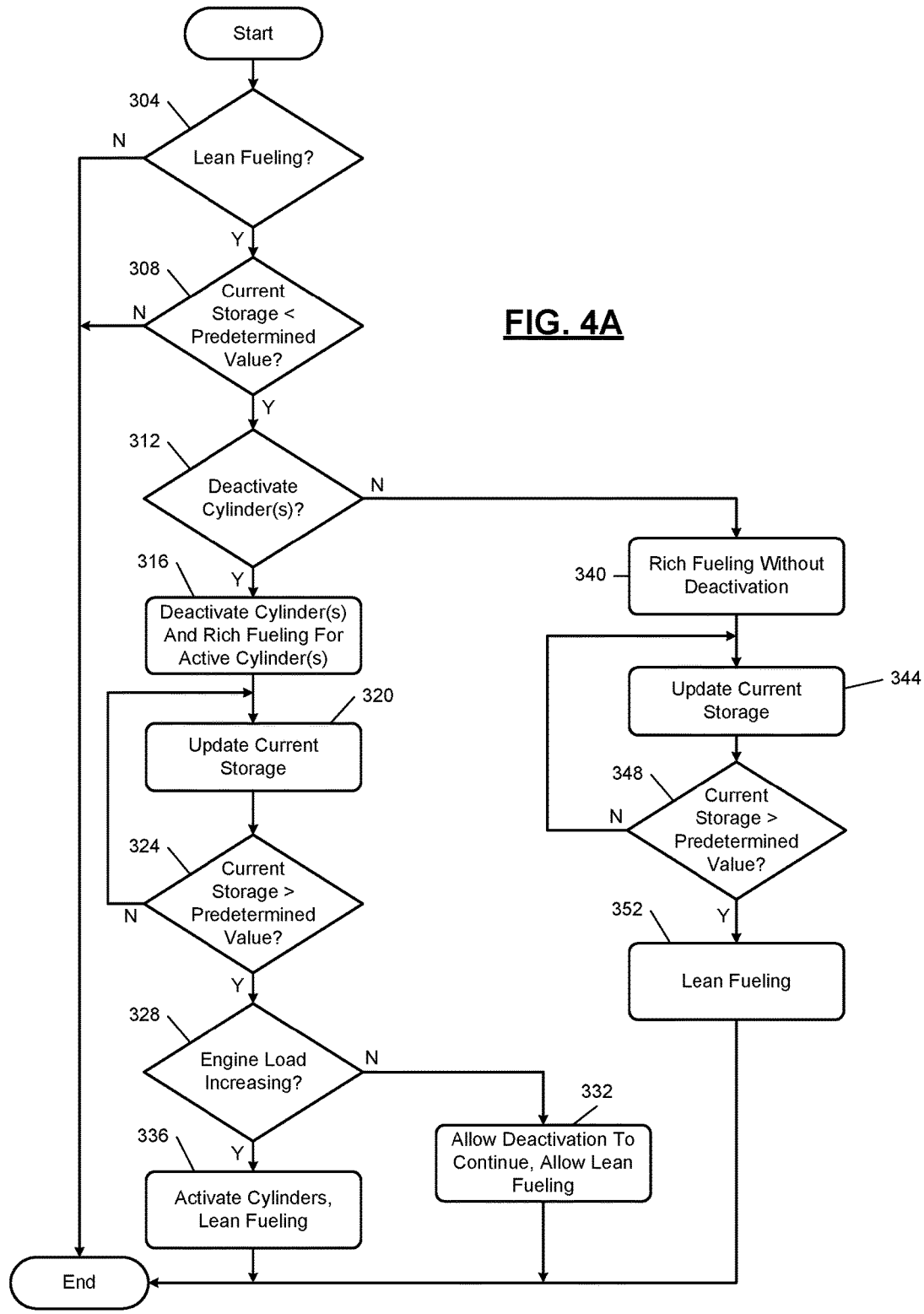

ENGINE CONTROL SYSTEMS AND METHODS FOR NITROGEN OXIDE REDUCTION

STATEMENT OF GOVERNMENT RIGHTS

This invention was produced pursuant to United States Government Program No. DE-EE00006853 with the Department of Energy (DoE). The U.S. Government has certain rights in this invention.

FIELD

The present disclosure relates to internal combustion engines and more particularly to engine control systems and methods for reducing nitrogen oxide (NOx) in exhaust.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve controls airflow into the engine. The air mixes with fuel from one or more fuel injectors to form an air/fuel mixture. The air/fuel mixture is combusted within one or more cylinders of the engine. Combustion of the air/fuel mixture generates torque.

Exhaust resulting from the combustion of the air/fuel mixture is expelled from the cylinders to an exhaust system. The exhaust includes nitrogen oxides (NOx), such as nitrogen oxide (NO) and nitrogen dioxide ($NO_2$), and other exhaust constituents. The exhaust system includes one or more components, such as a selective catalytic reduction (SCR) catalyst and/or a lean NOx trap, that reduce NOx in the exhaust before the exhaust is expelled to atmosphere.

SUMMARY

In a feature, an engine control system includes a fuel control module and a cylinder control module. The fuel control module controls fuel injection of an engine based on a predetermined lean air/fuel ratio, wherein the predetermined lean air/fuel ratio is fuel lean relative to a stoichiometric air/fuel ratio for the fuel. The cylinder control module selectively deactivates opening of intake and exhaust valves of M cylinders of the engine to increase removal of nitrogen oxide (NOx) from exhaust. M is an integer greater than 0 and less than a total number of cylinders of the engine. The fuel control module further: disables fueling of the M cylinders while opening of the intake and exhaust valves of the M cylinders is deactivated; and while fueling of the M cylinders is disabled and opening of the intake and exhaust valves of the M cylinders is deactivated, controls fuel injection of other cylinders of the engine based on a predetermined rich air/fuel ratio that is fuel rich relative to the stoichiometric air/fuel ratio for the fuel.

In further features, the cylinder control module deactivates opening of the intake and exhaust valves of the M cylinders when an amount of ammonia stored by a selective catalytic reduction (SCR) catalyst receiving exhaust output by the engine is less than a first predetermined amount of ammonia.

In further features, the cylinder control module re-activates opening of the intake and exhaust valves of the M cylinders when the amount of ammonia stored by SCR catalyst is greater than a second predetermined amount of ammonia, wherein the second predetermined amount of ammonia is greater than the first predetermined amount of ammonia.

In further features, the fuel control module transitions to controlling fuel injection of the other cylinders based on the predetermined lean air/fuel ratio when the amount of ammonia stored by SCR catalyst is greater than a second predetermined amount of ammonia, wherein the second predetermined amount of ammonia is greater than the first predetermined amount of ammonia.

In further features, the cylinder control module deactivates opening of the intake and exhaust valves of the M cylinders when: an amount of ammonia stored by a selective catalytic reduction (SCR) catalyst receiving exhaust output by the engine is less than a predetermined amount of ammonia; an engine speed is within a predetermined speed range; and an engine load is within a predetermined engine load range.

In further features, the cylinder control module deactivates opening of the intake and exhaust valves of the M cylinders when an amount of nitrogen oxides (NOx) stored by a lean NOx trap receiving exhaust output by the engine is greater than a first predetermined amount of NOx.

In further features, the cylinder control module re-activates opening of the intake and exhaust valves of the M cylinders when the amount of NOx stored by lean NOx trap is less than a second predetermined amount of NOx, wherein the second predetermined amount of NOx is less than the first predetermined amount of NOx.

In further features, the fuel control module transitions to controlling fuel injection of the other cylinders based on the predetermined lean air/fuel ratio when the amount of NOx stored by lean NOx trap is less than a second predetermined amount of NOx, wherein the second predetermined amount of NOx is less than the first predetermined amount of NOx.

In further features, the cylinder control module deactivates opening of the intake and exhaust valves of the M cylinders when: an amount of nitrogen oxides (NOx) stored by a lean NOx trap receiving exhaust output by the engine is greater than a predetermined amount of NOx; an engine speed is within a predetermined speed range; and an engine load is within a predetermined engine load range.

In further features, wherein M is equal to one-half of the total number of cylinders of the engine.

In a feature, an engine control method is described. The engine control method includes: controlling fuel injection of an engine based on a predetermined lean air/fuel ratio, wherein the predetermined lean air/fuel ratio is fuel lean relative to a stoichiometric air/fuel ratio for the fuel; selectively deactivating opening of intake and exhaust valves of M cylinders of the engine to increase removal of nitrogen oxide (NOx) from exhaust, wherein M is an integer greater than 0 and less than a total number of cylinders of the engine; disabling fueling of the M cylinders while opening of the intake and exhaust valves of the M cylinders is deactivated; and while fueling of the M cylinders is disabled and opening of the intake and exhaust valves of the M cylinders is deactivated, controlling fuel injection of other cylinders of the engine based on a predetermined rich air/fuel ratio that is fuel rich relative to the stoichiometric air/fuel ratio for the fuel.

In further features, selectively deactivating opening of intake and exhaust valves of M cylinders includes deactivating opening of the intake and exhaust valves of the M cylinders when an amount of ammonia stored by a selective catalytic reduction (SCR) catalyst receiving exhaust output by the engine is less than a first predetermined amount of ammonia.

In further features, the method further includes re-activating opening of the intake and exhaust valves of the M cylinders when the amount of ammonia stored by SCR catalyst is greater than a second predetermined amount of ammonia, wherein the second predetermined amount of ammonia is greater than the first predetermined amount of ammonia.

In further features, controlling fuel injection of the other cylinders based on the predetermined lean air/fuel ratio comprises transitioning to controlling the fuel injection of the other cylinders based on the predetermined lean air/fuel ratio when the amount of ammonia stored by SCR catalyst is greater than a second predetermined amount of ammonia, wherein the second predetermined amount of ammonia is greater than the first predetermined amount of ammonia.

In further features, selectively deactivating opening of intake and exhaust valves of M cylinders includes deactivating opening of the intake and exhaust valves of the M cylinders when: an amount of ammonia stored by a selective catalytic reduction (SCR) catalyst receiving exhaust output by the engine is less than a predetermined amount of ammonia; an engine speed is within a predetermined speed range; and an engine load is within a predetermined engine load range.

In further features, selectively deactivating opening of intake and exhaust valves of M cylinders includes deactivating opening of the intake and exhaust valves of the M cylinders when an amount of nitrogen oxides (NOx) stored by a lean NOx trap receiving exhaust output by the engine is greater than a first predetermined amount of NOx.

In further features, re-activating opening of the intake and exhaust valves of the M cylinders when the amount of NOx stored by lean NOx trap is less than a second predetermined amount of NOx, wherein the second predetermined amount of NOx is less than the first predetermined amount of NOx.

In further features, controlling fuel injection of the other cylinders based on the predetermined lean air/fuel ratio includes transitioning to controlling fuel injection of the other cylinders based on the predetermined lean air/fuel ratio when the amount of NOx stored by lean NOx trap is less than a second predetermined amount of NOx, wherein the second predetermined amount of NOx is less than the first predetermined amount of NOx.

In further features, selectively deactivating opening of intake and exhaust valves of M cylinders includes deactivating opening of the intake and exhaust valves of the M cylinders when: an amount of nitrogen oxides (NOx) stored by a lean NOx trap receiving exhaust output by the engine is greater than a predetermined amount of NOx; an engine speed is within a predetermined speed range; and an engine load is within a predetermined engine load range.

In further features, M is equal to one-half of the total number of cylinders of the engine.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 4A and 4B are flowcharts depicting example methods of controlling fueling for NOx reduction.

In the drawings, reference numbers may be reused to identify similar and/or identical elements.

DETAILED DESCRIPTION

An engine combusts air and fuel within cylinders to generate torque. An engine control module (ECM) controls air and fuel to the engine based on a target air/fuel ratio. For lean burn engines, the target air/fuel ratio is fuel lean relative to a stoichiometric air/fuel ratio during normal engine operation. As an example, stoichiometry for air and gasoline and air is approximately 14.7:1, while a lean burn gasoline engine may have a target air/fuel ratio of 16:1 air to gasoline or a greater amount of air, such as 20:1, 24:1, 28:1, etc.

The engine outputs exhaust resulting from combustion of air and fuel to an exhaust system. Among other things, the exhaust includes nitrogen oxides (NOx), such as nitrogen oxide (NO) and nitrogen dioxide ($NO_2$). The exhaust system includes one or more components that reduce NOx in the exhaust before the exhaust is expelled to atmosphere.

For example, the exhaust system may include a selective catalytic reduction (SCR) catalyst that stores ammonia ($NH_3$). Ammonia stored by the SCR catalyst reacts with NOx in the exhaust. A three way catalyst (TWC) generates and supplies ammonia to the SCR catalyst when fueling of the engine is fuel rich relative to stoichiometry. As another example, the exhaust system may include a lean NOx trap (LNT) that stores NOx and that reduces NOx when fueling of the engine is fuel rich relative to stoichiometry. According to the present disclosure, the ECM selectively deactivates one or more cylinders of the engine and provides fuel rich fueling (relative to stoichiometry) to the activated cylinders for NOx reduction in the case of an LNT and for ammonia generation/supply (and ultimately NOx reduction) in the case of an SCR.

Figure 1A:
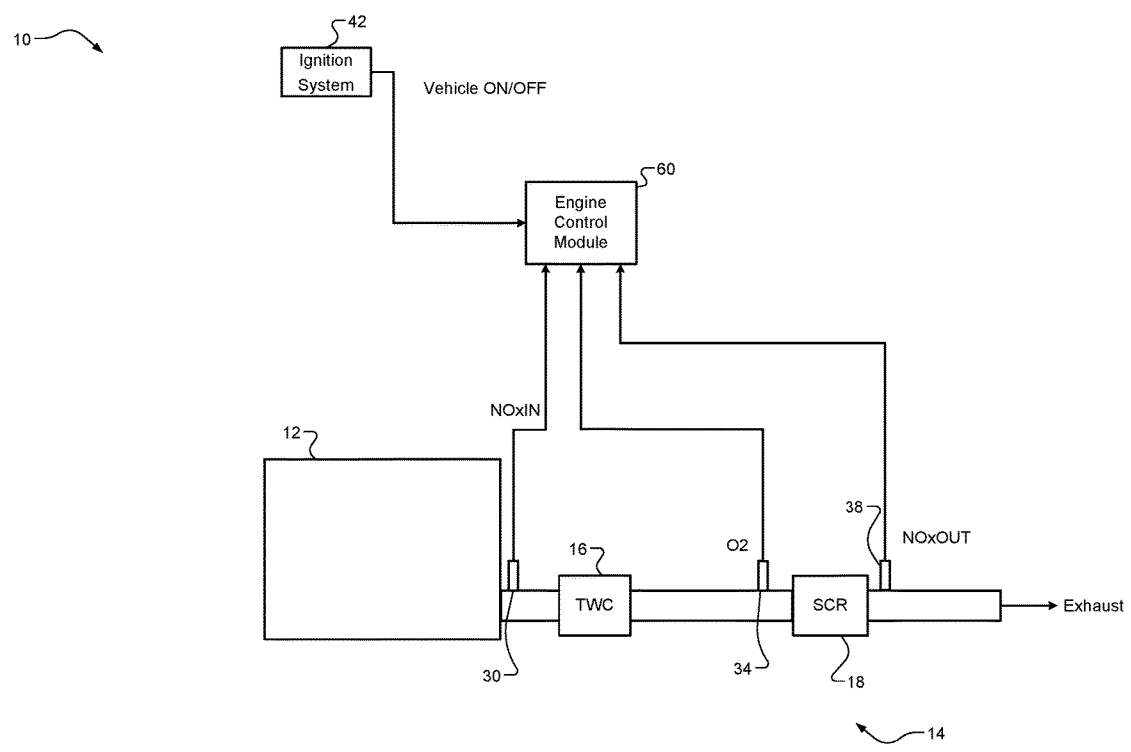
FIGS. 1A and 1B are functional block diagrams of engine and exhaust control systems of a vehicle.

Referring now to FIG. 1A, a functional block diagram of an example engine and exhaust system 10 is presented. An engine 12 combusts air and fuel to generate drive torque for a vehicle. While the engine 12 is shown and will be discussed as a gasoline type lean burn engine, the engine 12 may be another type of lean burn engine. One or more electric motors (or motor-generators) may additionally or alternatively generate drive torque for the vehicle.

Exhaust is expelled from the engine 12 to an exhaust system 14. The exhaust may include particulate matter (PM), nitrogen oxides (NOx), such as nitrogen oxide (NO) and nitrogen dioxide ($NO_2$), and other components. In the example of FIG. 1A, the exhaust system 14 includes a three way catalyst (TWC) 16 and a selective catalytic reduction (SCR) catalyst 18. While the example of a TWC is provided, a four way catalyst may be implemented.

The exhaust flows from the engine 12 to the TWC 16. When fueling of the engine 12 is fuel rich, the TWC 16 reacts with the exhaust and produces ammonia ($NH_3$). The exhaust flows from the TWC 16 to the SCR catalyst 18. In this manner, ammonia produced by the TWC 16 is provided to the SCR catalyst 18.

The SCR catalyst 18 stores (e.g., adsorbs) ammonia input to the SCR catalyst 18. For example only, the SCR catalyst 18 may include a vanadium catalyst, a zeolite catalyst, and/or another suitable type of SCR catalyst. The SCR catalyst 18 catalyzes a reaction between stored ammonia and NOx passing through the SCR catalyst 18. An example chemical equation that is illustrative of ammonia adsorption is provided below.

$$NH_3 + S \rightarrow NH_3(S)$$

The amount of ammonia stored by the SCR catalyst 18 is referred to as a current storage of the SCR catalyst 18. The current storage may be expressed, for example, as a mass of ammonia (e.g., grams), a number of moles of ammonia, or another suitable measure of an amount of ammonia stored by the SCR catalyst 18.

NOx and ammonia react at a known rate, which may be referred to as a reaction rate. The reaction rate may be described by the equation:

$$RR = \frac{X \text{ Moles } NH_3}{1 \text{ Mole } NOx},$$

where RR is the reaction rate and X varies depending on the amount of nitrogen dioxide ($NO_2$) in the exhaust. For example only, X may vary between from 1.0 and 1.333.

A percentage of NOx input to the SCR catalyst 18 that is removed from the exhaust via reaction with ammonia stored by the SCR catalyst 18 may be referred to as NOx conversion efficiency. The NOx conversion efficiency is directly related to the current storage of the SCR catalyst 18. For example only, the NOx conversion efficiency increases as the current storage of the SCR catalyst 18 increases, and vice versa. The current storage of the SCR catalyst 18, however, is limited to a maximum amount of ammonia. This maximum amount of ammonia is referred to as the maximum storage capacity of the SCR catalyst 18. The maximum amount of ammonia that the SCR catalyst 18 can store may increase as temperature of the SCR catalyst 18 decreases and vice versa.

The reaction of ammonia with NOx produces nitrogen and water. Other components of the exhaust, such as oxygen ($O_2$), may also be involved in the ammonia and NOx reaction. The example chemical equations provided below are illustrative of the reaction of ammonia and NOx.

$$4NH_3 + 4NO + O_2 \rightarrow 4N_2 + 6H_2O$$

$$4NH_3 + 2NO + 2NO_2 \rightarrow 4N_2 + 6H_2O$$

$$8NH_3 + 6NO_2 \rightarrow 7N_2 + 12H_2O$$

Figure 1B:
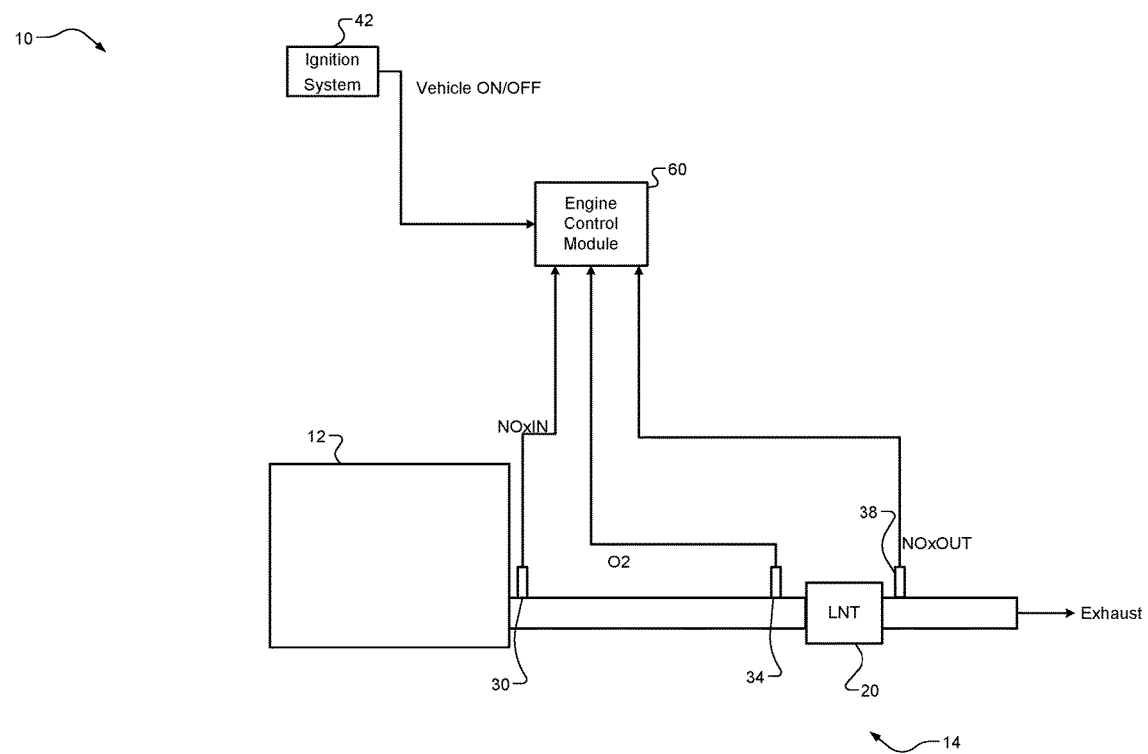

As shown in FIG. 1B, a lean NOx trap (LNT) 20 may be implemented in place of the TWC 16 and the SCR catalyst 18. The LNT 20 stores NOx in the exhaust flowing into the LNT 20. The LNT 20 reacts with stored NOx when fueling of the engine 12 (and therefore the resulting exhaust) is fuel rich relative to stoichiometry. The maximum amount of NOx that the LNT 20 can store may be referred to as maximum NOx storage.

Referring now to FIGS. 1A and 1B, a first NOx sensor 30 measures NOx in the exhaust output from the engine 12. For example only, the first NOx sensor 30 may measure a mass flowrate of NOx (e.g., grams per second), a concentration of NOx (e.g., parts per million), or another suitable measure of the amount of NOx.

An oxygen sensor 34 measures oxygen ($O_2$) in the exhaust. The oxygen sensor 34 generates an oxygen signal based on the oxygen in the exhaust upstream of the SCR catalyst 18. A second NOx sensor 38 measures NOx in the exhaust to be output from the exhaust system 14. For example only, the second NOx sensor 38 may measure a mass flowrate of NOx (e.g., grams per second), a concentration of NOx (e.g., parts per million), or another suitable measure of the amount of NOx.

A user initiates vehicle startup and shutdown events via an ignition system 42. For example only, the ignition system 42 may include one or more buttons, switches, and/or other devices that a user may actuate to command that the vehicle be turned ON and OFF.

An engine control module (ECM) 60 controls the torque output of the engine 12. The ECM 60 may also control the engine 12 based on signals from the ignition system 42. For example, the ECM 60 may initiate engine cranking to start the engine 12 when a vehicle ON signal is received. The ECM 60 may disable the engine 12 when a vehicle OFF signal is received. As discussed further below, the ECM 60 may deactivate one or more cylinders (e.g., half) of the engine 12 under some circumstances. Deactivation of a cylinder includes disabling opening and closing of intake and exhaust valves of the cylinder and disabling fueling of the cylinder.

Figure 2:
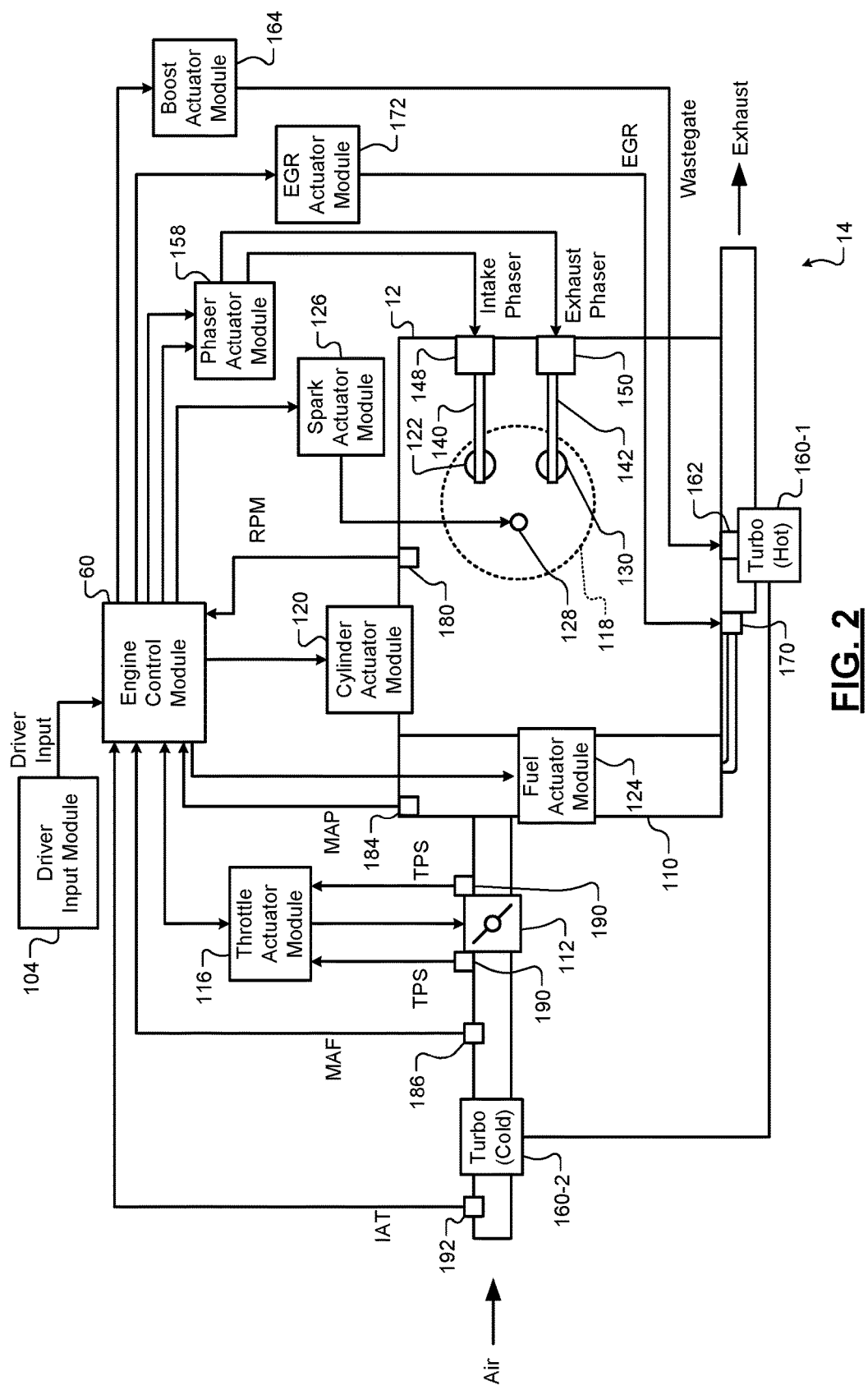
FIG. 2 is a functional block diagram of an example engine system.

Referring now to FIG. 2, a functional block diagram of an example engine system is presented. The engine 12 combusts an air/fuel mixture to produce drive torque for a vehicle based on driver input from a driver input module 104, such as accelerator pedal position and/or brake pedal position.

Air is drawn into the engine 12 through an intake system. For example only, the intake system may include an intake manifold 110 and a throttle valve 112. The throttle valve 112 may include a butterfly valve having a rotatable blade or another suitable type of throttle valve. The ECM 60 controls a throttle actuator module 116, and the throttle actuator module 116 regulates opening of the throttle valve 112 to control the amount of air drawn into the intake manifold 110.

Air from the intake manifold 110 is drawn into cylinders of the engine 12. While the engine 12 includes multiple cylinders, for illustration purposes a single representative cylinder 118 is shown. For example only, the engine 12 may include 2, 3, 4, 5, 6, 8, 10, and/or 12 cylinders. Under some circumstances, the ECM 60 may instruct a cylinder actuator module 120 to selectively deactivate opening of intake and exhaust valves of one or more of the cylinders.

The engine 12 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 60 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 60, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via the exhaust system 14.

The intake valve 122 may be controlled by an intake camshaft 140, while the exhaust valve 130 may be controlled by an exhaust camshaft 142. The cylinder actuator module 120 may deactivate the cylinder 118 by disabling opening of the intake valve 122 and/or the exhaust valve 130.

An intake cam phaser 148 selectively adjusts rotation of the intake camshaft 140 relative to rotation of the crankshaft. Adjusting the rotation of the intake camshaft 140 adjusts opening and closing timing of the intake valve 122. An exhaust cam phaser 150 selectively adjusts rotation of the exhaust camshaft 142 relative to rotation of the crankshaft. Adjusting the rotation of the exhaust camshaft 142 adjusts opening and closing timing of the exhaust valve 130.

A phaser actuator module 158 controls the intake cam phaser 148 and the exhaust cam phaser 150 based on signals from the ECM 60. When implemented, variable valve lift (not shown) may also be controlled by the phaser actuator module 158. The phaser actuator module 158 may also control the second intake and exhaust cam phasers based on signals from the ECM 60. While camshaft-based valve actuation is shown and discussed, camless valve actuation may be implemented.

The engine system may include a boost device that provides pressurized air to the intake manifold 110. For example, FIG. 2 shows a turbocharger including a turbine 160-1 that is powered by exhaust gases flowing through the exhaust system 14. The turbocharger also includes a compressor 160-2, driven by the turbine 160-1, that compresses air leading into the throttle valve 112. The turbine 160-1 may be upstream from the TWC 16 or the LNT 20. In various implementations, a supercharger (not shown), driven by the crankshaft, may compress air from the throttle valve 112 and deliver the compressed air to the intake manifold 110. An intercooler (not shown) may dissipate some of the heat contained in the compressed air charge, which is generated as the air is compressed. The compressed air charge may also have absorbed heat from components of the exhaust system 14.

A wastegate 162 may allow exhaust to bypass the turbine 160-1, thereby reducing the boost (the amount of intake air compression) of the turbocharger. The ECM 60 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

The engine system may include an exhaust gas recirculation (EGR) valve 170, which selectively redirects exhaust gas back to the intake manifold 110. The EGR valve 170 may be located upstream of the turbine 160-1. The EGR valve 170 may be controlled by an EGR actuator module 172 based on signals from the ECM 60.

A position of the crankshaft may be measured using a crankshaft position sensor 180. An engine speed, for example in revolutions per minute (RPM), may be generated based on the position of the crankshaft. A pressure within the intake manifold 110 may be measured using a manifold absolute pressure (MAP) sensor 184. In various implementations, engine vacuum, which may refer to a difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 12 may be measured using an intake air temperature (IAT) sensor 192. One or more other sensors may also be implemented. For example, the engine system may include an engine coolant temperature sensor, an oil temperature sensor, an engine (e.g., block) temperature sensor, and/or one or more other suitable vehicle sensors. The ECM 60 may use signals from the sensors to make control decisions for the engine system.

Figure 3:
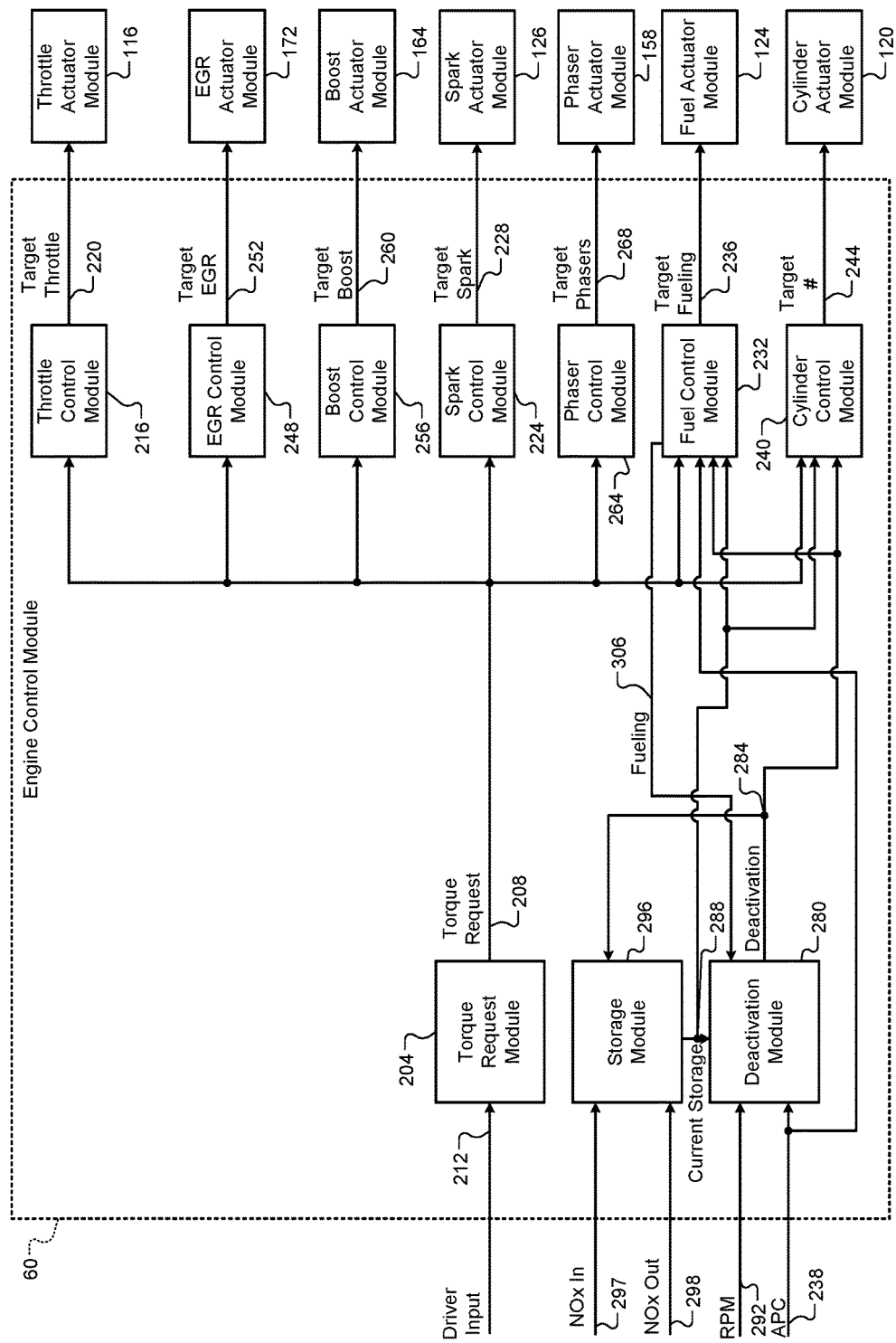
FIG. 3 is a functional block diagram of an example engine control module.

Referring now to FIG. 3, a functional block diagram of an example implementation of the ECM 60 is presented. A torque request module 204 may determine a torque request 208 based on one or more driver inputs 212, such as an accelerator pedal position, a brake pedal position, a cruise control input, and/or one or more other suitable driver inputs. The torque request module 204 may determine the torque request 208 additionally or alternatively based on one or more other torque requests, such as torque requests generated by the ECM 60 and/or torque requests received from other modules of the vehicle, such as a transmission control module, the hybrid control module, a chassis control module, etc. One or more engine actuators may be controlled based on the torque request 208 and/or one or more other vehicle operating parameters.

For example, a throttle control module 216 may determine a target throttle opening 220 based on the torque request 208. The throttle actuator module 116 may adjust opening of the throttle valve 112 based on the target throttle opening 220. A spark control module 224 may determine a target spark timing 228 based on the torque request 208. The spark actuator module 126 may generate spark based on the target spark timing 228.

A fuel control module 232 determines one or more target fueling parameters 236. More specifically, the fuel control module 232 determines a mass of fuel to inject for a cylinder to achieve a target air/fuel ratio with a mass of air trapped within the cylinder. This mass of air may be referred to as an air per cylinder (APC) 238. The fuel control module 232 generally sets the target air/fuel ratio to a predetermined lean air/fuel ratio during normal engine operation. For example only, the predetermined lean air/fuel ratio is greater than 16:1 air to gasoline and may be approximately 28:1 air to gasoline or another suitable ratio that is fuel lean relative to stoichiometry. Different types of fuel have different stoichiometric air/fuel ratios, but the predetermined lean air/fuel ratio is fuel lean and air rich relative to the stoichiometric air/fuel ratio for that type of fuel. The APC 238 may be determined, for example, based on a MAF into the engine 12 measured using the MAF sensor 186 using one or more functions or mappings that relate torque requests and/or MAFs to APCs. The target fueling parameters 236 may additionally include number of fuel injection pulses (per combustion event) and timing for each pulse. The fuel actuator module 124 may inject fuel based on the target fueling parameters 236.

A cylinder control module 240 may determine a target number of cylinders to activate and/or deactivate 244 based on the torque request 208. The cylinder actuator module 120 activates and deactivates opening of intake and exhaust valves of cylinders of the engine 12 based on the target number 244. The fuel control module 232 disables fueling of deactivated cylinders. An EGR control module 248 may determine a target EGR opening 252 for the EGR valve 170 based on the torque request 208. The EGR actuator module 172 may control the EGR valve 170 based on the target EGR opening 252.

A boost control module 256 may determine a target boost 260 based on the torque request 208. The boost actuator module 164 controls boost based on the target boost 260. For example, the boost actuator module 164 may control the wastegate 162 on the target boost 260. A phaser control module 264 may determine target intake and exhaust cam phaser angles 268 based on the torque request 208. The phaser actuator module 158 controls the intake and exhaust cam phasers 148 and 150 based on the target intake and exhaust cam phaser angles 268, respectively.

A deactivation module 280 selectively generates a deactivation command 284 for NOx reduction. The cylinder control module 240 deactivates one or more (e.g., half) of the cylinders of the engine 12 when the deactivation command 284 is generated. The fuel control module 232 adjusts the target air/fuel ratio to being fuel rich when the deactivation command 284 is generated. For example, the fuel control module 232 may set the target air/fuel ratio to a predetermined rich ratio when the deactivation command 284 is generated. The predetermined rich ratio may be, for example, 14:1 air to gasoline or another suitable fuel rich air/fuel ratio. The predetermined rich air/fuel ratio may correspond to approximately doubling fueling of activated cylinders relative to the predetermined lean air/fuel ratio. For example, in the case of the predetermined lean air/fuel ratio of 28:1, the predetermined rich air/fuel ratio may be approximately 14:1.

The deactivation module 280 generates the deactivation command 284 for NOx reduction when current (ammonia) storage of the SCR catalyst 18 is less than a first predetermined amount of ammonia. The deactivation module 280 may also require that an engine speed 292 and an engine load be within predetermined engine speed and load ranges for lean operation and/or within predetermined engine speed and load ranges for cylinder deactivation. The first predetermined amount of ammonia is greater than zero. In various implementations, a mass of fuel injection per cylinder may represent the engine load. The mass of fuel injection per cylinder may be, for example, the target mass of fuel to inject for a cylinder of the target fueling parameters 236. The engine speed 292 may be measured, for example, using the crankshaft position sensor 180.

A storage module 296 determines the current storage 288 of the SCR catalyst 18. For example only, the storage module 296 may determine the current storage 288 of the SCR catalyst 18 based on a supply rate of ammonia to the SCR catalyst 18, input NOx 297, output NOx 298, and an exhaust flow rate through the SCR catalyst 18. The storage module 296 may determine the current storage 288 of the SCR catalyst 18, for example, using one or more functions or mappings that relate supply rates, input NOx, output NOx, and exhaust flow rate to current storage.

The input NOx 297 may be measured using the first NOx sensor 30. The output NOx 298 may be measured using the second NOx sensor 38. The MAF may be used as the exhaust flow rate through the SCR catalyst 18. The supply rate of ammonia to the SCR catalyst 18 may be approximately zero when the predetermined lean air/fuel ratio is being used. The supply rate of ammonia to the SCR catalyst 18 is greater than zero when the predetermined rich air/fuel ratio is being used. The supply rate of ammonia to the SCR catalyst 18 when the predetermined rich air/fuel ratio is used is a predetermined value and may be fixed or variable. In the case of a variable, the storage module 296 may determine the supply rate, for example, using one or more functions and/or lookup tables that relate the number of deactivated cylinders, the predetermined rich air/fuel ratio, exhaust flow rate, and/or one or more operating parameters to supply rates of ammonia.

When the current storage 288 of the SCR catalyst 18 becomes greater than a second predetermined amount of ammonia during the fuel rich fueling, the fuel control module 232 may transition to fueling the (activated) cylinders based on the predetermined lean air/fuel ratio. The second predetermined amount of ammonia is greater than the first predetermined amount of ammonia.

When the current storage 288 of the SCR catalyst 18 becomes greater than the second predetermined amount of ammonia during fuel rich fueling, the cylinder control module 240 may maintain the one or more cylinders deactivated. For example, the cylinder control module 240 may maintain the one or more cylinders deactivated when the APC 238 is decreasing. The cylinder control module 240 may re-activate the one or more cylinders when the APC 238 is increasing. The fuel control module 232 may fuel both activated and re-activated cylinders based on the predetermined lean air/fuel ratio.

In the example of the LNT 20, the storage module 296 determines the current NOx storage 288 of the LNT 20. For example only, the storage module 296 may determine the current NOx storage 288 of the LNT 20 based on an NOx removal rate of the LNT 20, the input NOx 297, the output NOx 298, and the exhaust flow rate through the LNT 20. The storage module 296 may determine the current storage 288 of the LNT 20, for example, using one or more functions or mappings that relate NOx removal rates, input NOx, output NOx, and exhaust flow rate to current NOx storage.

The NOx removal rate of the LNT 20 corresponds to a rate at which NOx stored within the LNT 20 is being removed from the LNT 20. The NOx removal rate of the LNT 20 may be approximately zero when the predetermined lean air/fuel ratio is being used. The NOx removal rate may be greater than zero when the predetermined rich air/fuel ratio is being used. The NOx removal rate of the LNT 20 when the predetermined rich air/fuel ratio is used is a predetermined value and may be fixed or variable. In the case of a variable, the storage module 296 may determine the NOx removal rate, for example, using one or more functions and/or lookup tables that relate the number of deactivated cylinders, the predetermined rich air/fuel ratio, exhaust flow rate, and/or one or more operating parameters to NOx removal rates.

When the current NOx storage 288 of the LNT 20 becomes less than a second predetermined amount of NOx during fuel rich fueling, the fuel control module 232 may transition to fueling the (activated) cylinders based on the predetermined lean air/fuel ratio. The second predetermined amount of NOx is less than the first predetermined amount of NOx.

When the current NOx storage 288 of the LNT 20 becomes less than the second predetermined amount of NOx during fuel rich fueling, the cylinder control module 240 may maintain the one or more cylinders deactivated. For example, the cylinder control module 240 may maintain the one or more cylinders deactivated when the APC 238 is decreasing. The cylinder control module 240 may re-activate the one or more cylinders when the APC 238 is increasing. The fuel control module 232 may transition to fueling both activated and re-activated cylinders based on the predetermined lean air/fuel ratio.

Figure 4B:
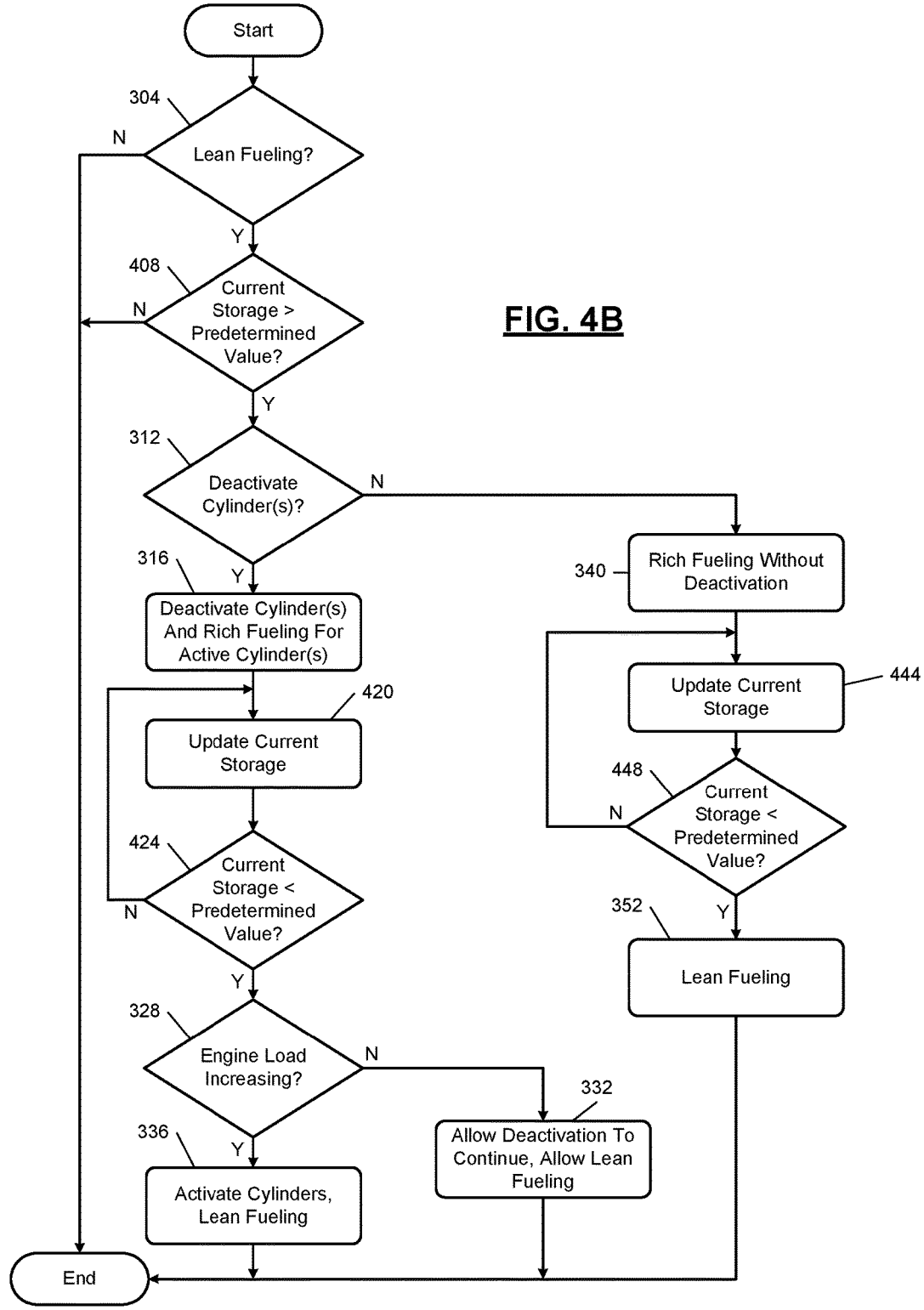

FIGS. 4A and 4B are flowcharts depicting example methods of controlling fueling for NOx reduction. Control begins when all of the cylinders of the engine 12 are activated. Referring now to FIGS. 3, 4A, and 4B, at 304 the deactivation module 280 determines whether lean fueling of the engine 12 is in use. For example, the fuel control module 232 may generate a fueling signal 306 that indicates whether fueling is being controlled based on the predetermined lean air/fuel ratio. Alternatively, the deactivation module 280 may determine whether the engine load (e.g., the APC 238) and the engine speed 292 are within predetermined ranges for fueling based on the predetermined lean air/fuel ratio at 304. If 304 is true, control continues with 308. If 304 is false, control may end.

At 308 of FIG. 4A, the deactivation module 280 may determine whether the current (ammonia) storage 288 of the SCR catalyst 18 is less than the first predetermined amount of ammonia. In the case of the LNT 20, at 408 of FIG. 4B the deactivation module 280 may determine whether the current NOx storage 288 of the LNT 20 is greater than the first predetermined amount of NOx at 308. If true, control continues with 312. If false, control may end.

At 312, the deactivation module 280 may determine whether to deactivate the one or more cylinders of the engine 12. For example, the deactivation module 280 may determine whether to deactivate one-half of the total number of cylinders of the engine 12 at 312. The deactivation module 280 may determine whether to deactivate the one or more cylinders of the engine 12 base on whether the engine load (e.g., the APC 238) and the engine speed 292 are within second predetermined ranges for deactivating the one or more cylinders during fuel rich fueling. If 312 is true, control continues with 316. If 312 is false, control transfers to 340, which is discussed further below.

At 316, the deactivation module 280 generates the deactivation command 284. In response to the deactivation command 284, at 316 the cylinder control module 240 deactivates opening of the intake and exhaust valves of the one or more cylinders and the fuel control module 232 disables fueling of those one or more (deactivated) cylinders. The fuel control module 232 also transitions to fueling the other (activated) cylinders based on the predetermined rich air/fuel ratio (e.g., 14:1 air to gasoline or another air/fuel ratio that is richer than stoichiometry for air and gasoline) at 316. For example, the predetermined rich air/fuel ratio may approximately double fueling of the active cylinders.

The storage module 296 updates the current storage 288. For example, the storage module 296 may decrease the current NOx storage 288 of the LNT 20 at 420 of FIG. 4B when fueling is based on the predetermined rich air/fuel ratio. The storage module 296 may increase the current ammonia storage 288 of the SCR catalyst 18 at 320 of FIG. 4A when fueling is based on the predetermined rich air/fuel ratio.

The fuel control module 232 and the cylinder control module 240 may compare the current storage 288 with a threshold. For example, the fuel control module 232 and the cylinder control module 240 may determine at 324 of FIG. 4A whether the current ammonia storage 288 of the SCR catalyst 18 is greater than the second predetermined amount of ammonia. In the case of the LNT 20, at 424 of FIG. 4B the fuel control module 232 and the cylinder control module 240 may determine whether the current NOx storage 288 of the LNT 20 is less than the second predetermined amount of NOx. If true, control continues with 328. If false, control may return to 320 or 420 and allow the cylinder deactivation with fuel rich operation of activated cylinders to continue. This allows current NOx storage to decrease in the case of the LNT 20 or current ammonia storage to increase in the case of the SCR catalyst 18.

At 328, the fuel control module 232 and the cylinder control module 240 may determine whether the engine load (e.g., the APC 328) is increasing. If 328 is true, the cylinder control module 240 re-activates the (previously deactivated) one or more cylinders and the fuel control module 232 fuels the re-activated cylinders as necessary at 336. The fuel control module 232 may, for example, return to fueling all cylinders based on the predetermined lean air/fuel ratio at 336. If 328 is false, the cylinder control module 240 may allow the one or more deactivated cylinders to remain deactivated at 332. The fuel control module 232 continues to disable fueling of deactivated cylinders. The fuel control module 232, however, may transition fueling of the active cylinders based on the predetermined lean air/fuel ratio at 332.

Referring back to 340 (i.e., when the decision is made to not deactivate one or more of the cylinders at 312), the fuel control module 232 transitions to fueling all of the cylinders based on the predetermined rich air/fuel ratio (e.g., 14:1 air to gasoline or another air/fuel ratio that is richer than stoichiometry for air and gasoline). Without deactivating cylinders, however, the throttle control module 216 may decrease the target throttle opening 220 of the throttle valve 112 to reduce airflow into the engine 12 and pressure within the intake manifold 110 in preparation for the use of the predetermined rich air/fuel ratio. This may decrease fuel efficiency (e.g., increase fuel consumption) relative to deactivating one or more cylinders at 316. In the case of the path of 316, manifold pressure and the APC 238 may remain approximately constant, so reducing the opening of the throttle valve 112 may not be needed or may be performed to a lesser extent.

The storage module 296 updates the current storage 288. For example, the storage module 296 may decrease the current NOx storage 288 of the LNT 20 at 444 of FIG. 4B when fueling is based on the predetermined rich air/fuel ratio. The storage module 296 may increase the current ammonia storage 288 of the SCR catalyst 18 at 344 of FIG. 4A when fueling is based on the predetermined rich air/fuel ratio.

The fuel control module 232 and the cylinder control module 240 may compare the current storage 288 with the threshold. For example, the fuel control module 232 and the cylinder control module 240 may determine at 348 of FIG. 4A whether the current ammonia storage 288 of the SCR catalyst 18 is greater than the second predetermined amount of ammonia. In the case of the LNT 20, at 448 of FIG. 4B the fuel control module 232 and the cylinder control module 240 may determine whether the current NOx storage 288 of the LNT 20 is less than the second predetermined amount of NOx. If true, control continues with 352. If false, control may return to 344 or 444 and allow the with fuel rich operation to continue. This allows current NOx storage to decrease in the case of the LNT 20 or current ammonia storage to increase in the case of the SCR catalyst 18. At 352, the fuel control module 232 returns to fueling all cylinders based on the predetermined lean air/fuel ratio. While the examples of FIGS. 4A and 4B are shown as ending, control may return to 304.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An engine control system, comprising:
a fuel control module that controls fuel injection of an engine based on a predetermined lean air/fuel ratio, wherein the predetermined lean air/fuel ratio is fuel lean relative to a stoichiometric air/fuel ratio for the fuel; and
a cylinder control module that deactivates opening of intake and exhaust valves of M cylinders of the engine to facilitate removal of nitrogen oxide (NOx) from exhaust in response to a determination that:
an amount of ammonia stored by a selective catalytic reduction (SCR) catalyst receiving exhaust output by the engine is less than a first predetermined amount of ammonia;
an engine speed is within a predetermined speed range for facilitating the removal of NOx; and
an engine load is within a predetermined engine load range for facilitating the removal of NOx,
wherein M is an integer greater than 0 and less than a total number of cylinders of the engine,
wherein the fuel control module further:
disables fueling of the M cylinders while opening of the intake and exhaust valves of the M cylinders is deactivated; and
while fueling of the M cylinders is disabled and opening of the intake and exhaust valves of the M cylinders is deactivated, controls fuel injection of other cylinders of the engine based on a predetermined rich air/fuel ratio that is fuel rich relative to the stoichiometric air/fuel ratio for the fuel;
wherein the cylinder control module further re-activates opening of the intake and exhaust valves of the M cylinders in response to a determination that:
the amount of ammonia stored by SCR catalyst is greater than a second predetermined amount of ammonia, wherein the second predetermined amount of ammonia is greater than the first predetermined amount of ammonia; and
the engine load is increasing;
wherein the fuel control module further controls fuel injection of the M cylinders after the re-activation based on the predetermined lean air/fuel ratio in response to the determination that:
the amount of ammonia stored by SCR catalyst is greater than the second predetermined amount of ammonia; and
the engine load is increasing;
wherein the cylinder control module further continues to deactivate the opening of the intake and exhaust valves of the M cylinders of the engine in response to a determination that:
the amount of ammonia stored by SCR catalyst is greater than the second predetermined amount of ammonia; and
the engine load is not increasing; and
wherein, during the continued deactivation, the fuel control module further controls the fuel injection of the other cylinders based on the predetermined lean air/fuel ratio in response to the determination that:
the amount of ammonia stored by SCR catalyst is greater than the second predetermined amount of ammonia; and
the engine load is not increasing.

2. The engine control system of claim 1 wherein M is equal to one-half of the total number of cylinders of the engine.

3. An engine control method, comprising:
controlling fuel injection of an engine based on a predetermined lean air/fuel ratio, wherein the predetermined lean air/fuel ratio is fuel lean relative to a stoichiometric air/fuel ratio for the fuel;
deactivating opening of intake and exhaust valves of M cylinders of the engine to facilitate removal of nitrogen oxide (NOx) from exhaust in response to a determination that:
an amount of ammonia stored by a selective catalytic reduction (SCR) catalyst receiving exhaust output by the engine is less than a first predetermined amount of ammonia;
an engine speed is within a predetermined speed range for facilitating the removal of NOx; and
an engine load is within a predetermined engine load range for facilitating the removal of NOx,
wherein M is an integer greater than 0 and less than a total number of cylinders of the engine;
disabling fueling of the M cylinders while opening of the intake and exhaust valves of the M cylinders is deactivated; and
while fueling of the M cylinders is disabled and opening of the intake and exhaust valves of the M cylinders is deactivated, controlling fuel injection of other cylinders of the engine based on a predetermined rich air/fuel ratio that is fuel rich relative to the stoichiometric air/fuel ratio for the fuel;
re-activating opening of the intake and exhaust valves of the M cylinders in response to a determination that:
the amount of ammonia stored by SCR catalyst is greater than a second predetermined amount of ammonia, wherein the second predetermined amount of ammonia is greater than the first predetermined amount of ammonia; and
the engine load is increasing;
controlling fuel injection of the M cylinders after the re-activation based on the predetermined lean air/fuel ratio in response to the determination that:
the amount of ammonia stored by SCR catalyst is greater than the second predetermined amount of ammonia; and
the engine load is increasing;
continuing to deactivate the opening of the intake and exhaust valves of the M cylinders of the engine in response to a determination that:
the amount of ammonia stored by SCR catalyst is greater than the second predetermined amount of ammonia; and
the engine load is not increasing; and
during the continued deactivation, controlling the fuel injection of the other cylinders based on the predetermined lean air/fuel ratio in response to the determination that:
the amount of ammonia stored by SCR catalyst is greater than the second predetermined amount of ammonia; and
the engine load is not increasing.

4. The engine control method of claim 3 wherein M is equal to one-half of the total number of cylinders of the engine.

* * * * *